US010351412B2

United States Patent
Szeteli

(10) Patent No.: US 10,351,412 B2
(45) Date of Patent: Jul. 16, 2019

(54) WITHDRAWAL SYSTEM

(71) Applicant: as Strömungstechnik GmbH, Ostfildern (DE)

(72) Inventor: Andreas Szeteli, Ostfildern (DE)

(73) Assignee: as Strömungstechnik GmbH, Ostfildern (DE)

( * ) Notice: Subject to any disclaimer, the term of this patent is extended or adjusted under 35 U.S.C. 154(b) by 0 days.

(21) Appl. No.: 15/866,495

(22) Filed: Jan. 10, 2018

(65) Prior Publication Data

US 2018/0209566 A1 Jul. 26, 2018

(30) Foreign Application Priority Data

Jan. 26, 2017 (EP) ..................... 17153222

(51) Int. Cl.
*B67D 1/08* (2006.01)
*B67D 7/02* (2010.01)
*B67D 3/00* (2006.01)
*F16L 19/00* (2006.01)
*F16L 15/08* (2006.01)
*B67D 7/34* (2010.01)
*F16L 55/00* (2006.01)
*B67D 7/32* (2010.01)

(52) U.S. Cl.
CPC ......... *B67D 1/0848* (2013.01); *B67D 1/0829* (2013.01); *B67D 3/0064* (2013.01); *B67D 3/0074* (2013.01); *B67D 7/02* (2013.01); *B67D 7/0288* (2013.01); *B67D 7/0294* (2013.01); *B67D 7/32* (2013.01); *B67D 7/344* (2013.01); *F16L 15/08* (2013.01); *F16L 19/005* (2013.01); *F16L 55/00* (2013.01); *B67D 2001/0811* (2013.01); *Y10T 137/2863* (2015.04); *Y10T 137/2911* (2015.04); *Y10T 137/2917* (2015.04); *Y10T 137/314* (2015.04); *Y10T 137/598* (2015.04); *Y10T 137/613* (2015.04); *Y10T 137/6137* (2015.04); *Y10T 137/8225* (2015.04); *Y10T 137/9029* (2015.04)

(58) Field of Classification Search
CPC .......... Y10T 137/314; Y10T 137/6137; Y10T 137/9029; Y10T 137/613; Y10T 137/2863; Y10T 137/2917; Y10T 137/8225; Y10T 137/2911; Y10T 137/598; F16L 19/005; F16L 15/08; B67D 7/0294; B67D 7/0288; B67D 1/0829; B67D 1/0848; B67D 3/0064
See application file for complete search history.

(56) References Cited

U.S. PATENT DOCUMENTS

| | | | | |
|---|---|---|---|---|
| 3,357,602 A | * | 12/1967 | Sichler | B67D 1/0832 137/853 |
| 3,464,435 A | * | 9/1969 | Lamb | B67D 1/0832 137/212 |
| 4,736,926 A | * | 4/1988 | Fallon | B67D 1/0832 137/212 |

(Continued)

*Primary Examiner* — Atif H Chaudry
(74) *Attorney, Agent, or Firm* — Michael Soderman

(57) ABSTRACT

A withdrawal system (1) for a container (2) and comprises an immersion pipe (4) mounted on and projecting into the container (2) as well as a withdrawal head (5) that is attachable to the immersion pipe (4) by means of a rotary connection. The withdrawal head (5) attached to the immersion pipe (4) is secured by means of a mechanical locking unit.

12 Claims, 4 Drawing Sheets

(56) References Cited

U.S. PATENT DOCUMENTS

| | | | | |
|---|---|---|---|---|
| 4,902,047 A | * | 2/1990 | Marietta | E21B 17/043 285/334 |
| 6,425,502 B1 | * | 7/2002 | Rauworth | B65D 1/20 137/212 |

* cited by examiner

WITHDRAWAL SYSTEM

CROSS REFERENCE TO RELATED APPLICATIONS

This application claims the priority of EP 17153222.9 filed on 2017 Jan. 26; this application is incorporated by reference herein in its entirety.

BACKGROUND

The invention relates to a withdrawal system according to the preamble of claim 1.

This type of withdrawal system is generally used to fill and empty containers, in particular barrels, that are filled with liquid chemicals. To fill or empty the container, the container has an immersion pipe that is typically mounted in the cover of the container and from there projects into the interior of the container. A withdrawal head is secured to the immersion pipe to enable liquid to be fed into or withdrawn from the container. This immersion pipe is connected via pipes to a pump, by means of which liquid is pumped into or out of the container.

A withdrawal system of this type is known from DE 10 2013 110 020 A1. In this withdrawal system, a switch is provided on the withdrawal head that signals whether or not the withdrawal head is attached in an intended position on the immersion pipe. This switch thus detects incorrect attachments of the withdrawal head to the immersion pipe, which are indicated by an alarm indication or the like. The operating personnel can thereby detect the unsatisfactory attachment and then undertake corrective measures.

A problem associated with withdrawal systems of this type is that even an initially correct connection between immersion pipe and withdrawal head can be loosened or detached by mechanical disturbing influences and the like and this can go undetected or be detected by such a switch only if liquid can escape from the container via the loosened closure. An occurrence of such problems is especially a concern if the withdrawal system of the container is connected to a diaphragm pump for the purpose of withdrawing or adding liquid. Membrane pumps of this type generate vibrations that are transmitted via the hose or piping system to the withdrawal system. The threaded connection of the withdrawal head to the immersion pipe can be loosened by these vibrations. As a result, this connection will leak, and liquid can escape in an uncontrolled manner. In order to correct such faults, the operation of the withdrawal system must be interrupted, and the connection between withdrawal head and immersion pipe must be correctly re-established, which is time-consuming and results in correspondingly long down-times.

SUMMARY

The invention relates to a withdrawal system (1) for a container (2) and comprises an immersion pipe (4) mounted on and projecting into the container (2) as well as a withdrawal head (5) that is attachable to the immersion pipe (4) by means of a rotary connection. The withdrawal head (5) attached to the immersion pipe (4) is secured by means of a mechanical locking unit.

DETAILED DESCRIPTION

The present invention seeks to solve the problem of providing a withdrawal system of the type mentioned at the outset that has increased operational reliability while requiring little design effort.

The features of claim 1 are specified to solve this problem. Advantageous embodiments and useful further developments of the invention are described in the dependent claims.

The invention relates to a withdrawal system for a container and comprises an immersion pipe mounted on and projecting into the container as well as a withdrawal head that is attachable to the immersion pipe by means of a rotary connection. The withdrawal head attached to the immersion pipe is secured by means of a mechanical locking unit.

The mechanical locking unit according to the invention increases the operational reliability of the withdrawal system in a simple manner. The mechanical locking unit secures the withdrawal head in its attachment position on the immersion pipe, thereby ensuring that the attachment of the withdrawal head to the immersion pipe can no longer become loose due to external disturbing influences.

In particular, the mechanical locking unit ensures that vibrations transmitted to the withdrawal system—which are caused, for example, by membrane pumps that are used to feed liquid into or withdraw liquid from the container—cannot cause uncontrolled loosening of the withdrawal head's attachment to the immersion pipe.

Thus, the mechanical locking unit acts as a locking system for a withdrawal system and reliably prevents unwanted maintenance work or down-times because of leaks at the interface between withdrawal head and immersion pipe. This ensures trouble-free withdrawal of liquids from the container or feeding of liquids into the container via the withdrawal system.

Another important advantage of the invention is that the mechanical locking unit operates in a purely mechanical manner and, thus, without electrical parts. The mechanical locking unit therefore has an exceedingly simple and economic design. Furthermore, the structure of the mechanical locking unit has a robust and therefore fail-safe design.

According to an advantageous embodiment of the invention, the mechanical locking unit has an actuation element that is movable into a locking position and into a release position. In the locking position, the actuation element locks the rotary connection between withdrawal head and immersion pipe. In the release position, the actuation element releases the rotary connection between withdrawal head and immersion pipe.

The actuation element is preferably manually movable along a guide or is in general positively guided between the locking position and the release position, whereby the attachment of the withdrawal head to the immersion pipe can be secured in a very simple manner, in particular it can be locked or, if necessary, released so that it can be detached. It is also advantageous that the locking and release of the attachment of the withdrawal head on the immersion pipe is unambiguously specified by the two defined end positions, namely, the locking position and the release position, and therefore can also be easily checked by the operating personnel.

According to a structurally advantageous design, the actuation element is a sliding element, the sliding element being movable along an axis running parallel to the longitudinal axis of the immersion pipe.

The sliding element forms an easily operable component that can also be easily and economically manufactured.

According to an especially advantageous embodiment, the mechanical locking unit has a locking element firmly connected to the immersion pipe and said locking element has an arrangement of projections discretely positioned in the circumferential direction around the immersion pipe. In the locking position, the actuation element is secured at a projection or between two projections. The locking element cooperating with the actuation element provides an especially simple and at the same time reliable securing of the withdrawal head in its attachment position on the immersion pipe.

It is further advantageous that the mechanical locking unit, made up of an actuation element and a locking element, forms a modular system that can also be retrofitted on existing withdrawal systems.

As a result, it is especially advantageous that the locking element has a plurality of projections that can be brought into engagement with the actuation elements in the locked position in order to secure the attachment of the withdrawal head to the immersion pipe. This applies in particular for the case that the withdrawal head is affixed to the immersion pipe by a threaded connection.

In this case, there is no precisely defined attachment position between withdrawal head and immersion pipe; rather, this position depends on how firmly the threaded connection between these units is tightened. Accordingly, the relative position of the actuation element with respect to the locking element can also vary with the attachment position.

Because the locking element has a plurality of projections, the actuation element can be secured, according to the attachment position, on the projection which is located right in the engagement region of the actuation element. The flexibility of the mechanical locking unit is further increased in that the actuation element can also be secured—in particular positionally secured—between two projections, if there is no projection located in the engagement region of the actuation element. A small amount play for the actuation element between two adjacent projections is in such a case non-critical, because the small relative movement permitted as a result between withdrawal head and immersion pipe cannot cause the attachment between these units to come loose in a way that results in leakage and the like.

According to a structurally advantageous design, the sliding element forming the actuation element is latched in the locking position at a projection or is located in an intermediate space between two projections.

In this embodiment, the sliding element has a wall element that surrounds a cavity, said cavity terminating at an end face of the sliding element. In a locking position of the sliding element, a projection projects into the cavity of the sliding element.

An especially secure attachment of the actuation element to the respective projection is obtained with this embodiment.

Especially advantageously, the locking element has an annular segment that surrounds the immersion pipe in the circumferential direction. The projections terminate in the radial direction at the outer edge of the annular segment. The locking element formed in this way has a simple structure and can economically be manufactured as a molded part, such as a plastic injection-molded part.

Also advantageously, the projections are identically configured and are arranged at equidistant intervals in the circumferential direction of the annular segment. The identical configuration of the projections ensures that the actuation element can latch in like manner at each projection. The equidistant distribution of the projections provides a maximum number of possible locking positions for the actuation element.

Also advantageously, pins are provided on the locking element by means of which the locking element is affixed to the immersion pipe.

The actuation element is assigned to and movably mounted with respect to the locking element, the latter being firmly connected to the immersion pipe.

In this context, the actuation element is advantageously mounted on a collar circumferentially surrounding the withdrawal head.

The collar is conveniently screwed onto a receptacle of the immersion pipe in order to affix the withdrawal head to the immersion pipe.

A modular, easy to handle system for affixing and securing the withdrawal head to the immersion pipe is thus created.

BRIEF DESCRIPTION OF THE DRAWINGS

The invention is explained below in reference to the drawings. The figures show.

DETAILED DESCRIPTION OF THE PREFERRED EMBODIMENTS

Figure 1:
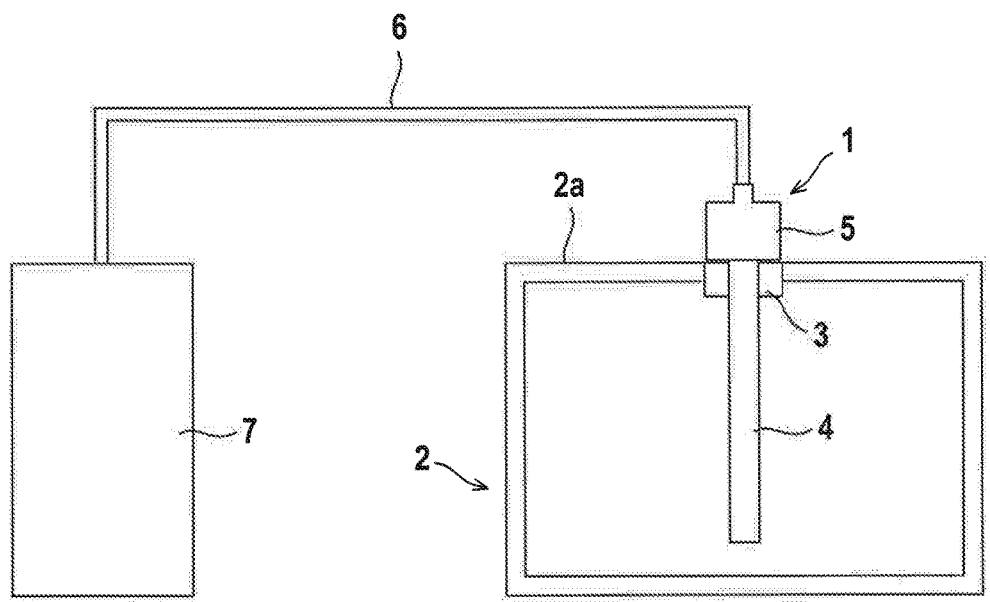
FIG. 1: Schematic diagram of a container having a withdrawal system and an associated pump.

FIG. 1 schematically shows a withdrawal system 1 on a container 2. A liquid is stored in the container 2. The liquids that are stored in containers 2 of this type are in particular liquid special components.

A bung body 3 is mounted in a container opening in the cover 2a of the container 2. This bung body 3 holds an immersion pipe 4 as a first component of the withdrawal system 1. The immersion pipe 4 runs in the vertical direction and extends to just above the bottom of the container 2.

A withdrawal head 5 is attached at the upper end of the immersion pipe 4 as another component of the withdrawal system 1, the attachment of the withdrawal head 5 to the immersion pipe 4 generally being designed in the form of a rotary connection, in the present case in the form of a threaded connection.

A piping system 6 that is connected to a pump 7, for example a diaphragm pump, is connected at the withdrawal head 5. When withdrawal head 5 is attached to the immersion pipe 4, liquid can be withdrawn from the container 2 through the piping system 6 by means of the pump 7. Liquid can also be fed into the container 2.

Figure 2:
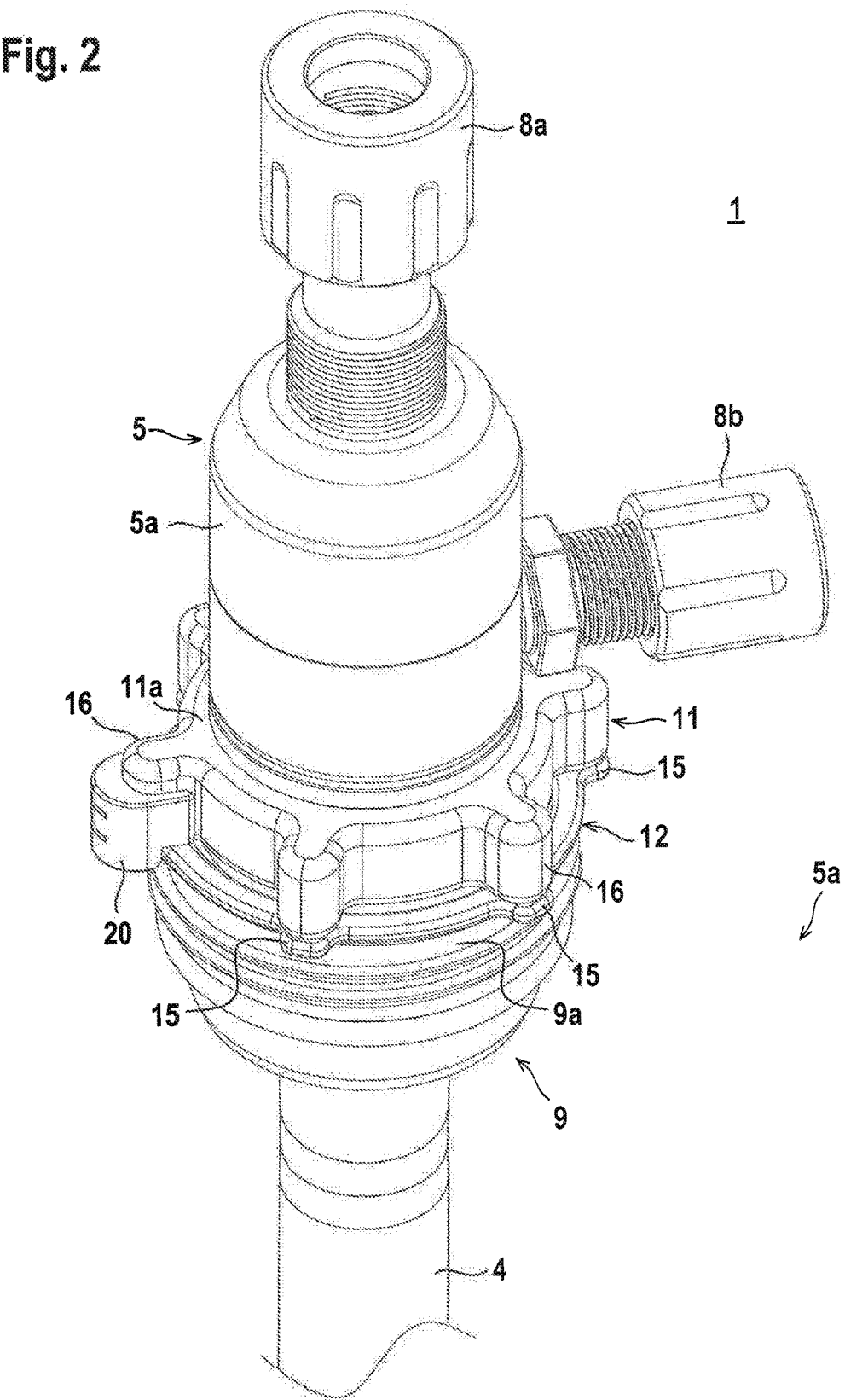
FIG. 2: Perspective view of the withdrawal system according to the invention.
Figure 3:
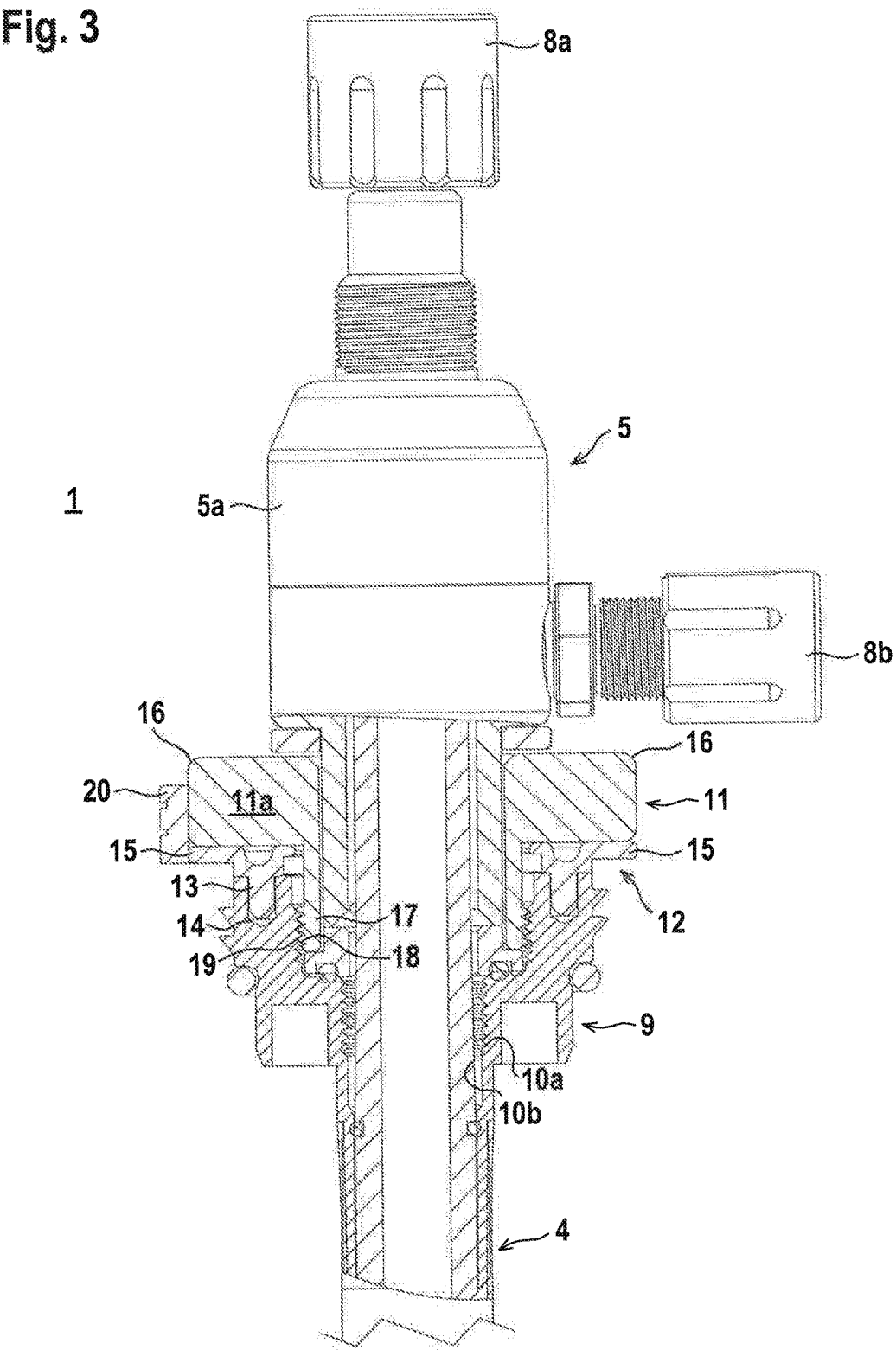
FIG. 3: Partially cutaway view of the withdrawal system according to the invention.

FIGS. 2 and 3 show an exemplary embodiment of the withdrawal system 1 according to the invention.

As is evident from FIGS. 2 and 3, the withdrawal head 5 of the withdrawal system 1 has two connectors 8a, 8b, which are used in particular for the connection of the piping system 6. A head piece 9 is attached with a threaded connection to the top end of the hollow cylindrical immersion pipe 4. The immersion pipe 4 and the head piece 9 have corresponding threads 10a, 10b for this purpose. The head piece 9, which is a component of the immersion pipe 4, is rotationally symmetrical designed and has a flat top side that forms a seating surface 9a. The head piece 9 is mounted in the bung body 3 in the container opening.

The withdrawal head 5 has a base body 5a with a cylindrical outer surface and an axis of symmetry that coincides with the axis of symmetry of the immersion pipe 4 when the withdrawal head 5 is attached to the immersion pipe 4. The lower region of the base body 5a has a slightly smaller width. A collar 11 and a likewise annular locking element 12, which surround the outer surface of the base body 5a, are mounted there as components of the withdrawal head 5. The axes of symmetry of these elements coincide with the axis of symmetry of the withdrawal head 5.

The locking element 12 mounted below the collar 11 has a flat, annular segment that extends in a plane and rests on the seating surface 9a of the head piece 9 of the immersion pipe 4. Pins 13 project from the bottom of the annular segment of the locking element 12. The pins 13 are latched in recesses 14 of the head piece 9 that terminate at the seating surface 9a (FIG. 3). As a result, the locking element 12 is firmly connected to the head piece 9 and, thus, to the immersion pipe 4.

Projections 15, which extend in the plane of the annular segment of the locking element 12, terminate at the outer edge of the annular segment. The projections 15 are identically configured and are arranged at equidistant intervals in the circumferential direction of the locking element 12.

The collar 11 has an annular body 11a at which projection elements 16 terminate in the radial direction (FIG. 2). The quantity, arrangement and cross-sectional contour of the projection elements 16 correspond to the projections 15 of the locking element 12.

As FIG. 3 shows, a hollow-cylindrical connecting piece 17 terminates at the underside of the annular body 11a. The hollow cylindrical connecting piece 17 has male threads 18 that are engaged with female threads 19 of the head piece 9.

While the locking element 12 is firmly connected to the immersion pipe 4 by means of the pins 13, the collar 11 is rotatably mounted. The collar 11 is used to create a threaded connection between withdrawal head 5 and immersion pipe 4 in such a way that the collar 11 is firmly screwed via the male threads 18 of the connecting piece 17 to the female threads 19 of the head piece 9.

As soon as this threaded connection is tightened, the withdrawal head 5 is attached to the immersion pipe 4 and the collar 11 is located in an attachment position.

To secure the attachment position and, thus, the threaded connection formed between withdrawal head 5 and immersion pipe 4, according to the invention an actuation element is provided that in the present case is formed by a sliding element 20. The actuation element together with the locking element 12 forms a mechanical locking unit.

The actuation element is mounted on one of the projection elements 16 of the collar 11, as FIG. 2 shows in particular.

The sliding element 20 is formed by a hollow body that is open on its bottom side. The wall element that surrounds the cavity of the sliding element 20, as FIG. 2 shows, is adapted to the outer contour of the projection element 16. The sliding element 20 can be displaced in the axial direction on the projection element 16—that is, in the vertical direction—between a top end position, which defines a release position, and a bottom end position, which defines a locking position.

Figure 4:
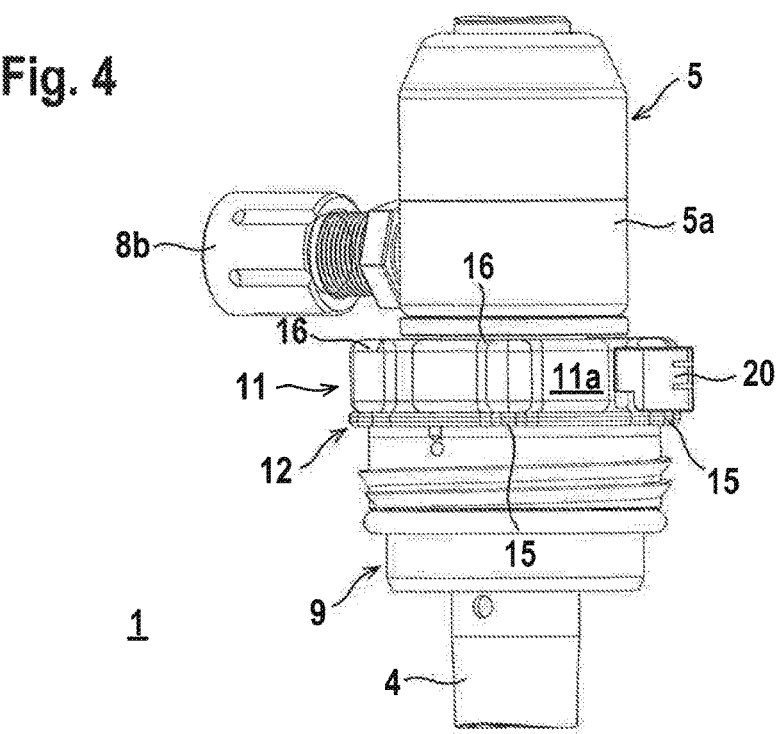
FIG. 4: Detailed view of the withdrawal system according to FIGS. 2 and 3 with a sliding element in a release position.

In the release position (FIG. 4), the sliding element 20 is located above the locking element 12. In this release position of the sliding element 20, the collar 11 can be turned freely with respect to the locking element 12, in particular in order to form the threaded connection between immersion pipe 4 and withdrawal head 5.

As soon as the threaded connection between immersion pipe 4 and withdrawal head 5 is produced, the connection is secured against inadvertent opening, in particular opening caused by disturbing external influences, solely by moving the sliding element 20, preferably manually, into the locking position.

Figure 5:
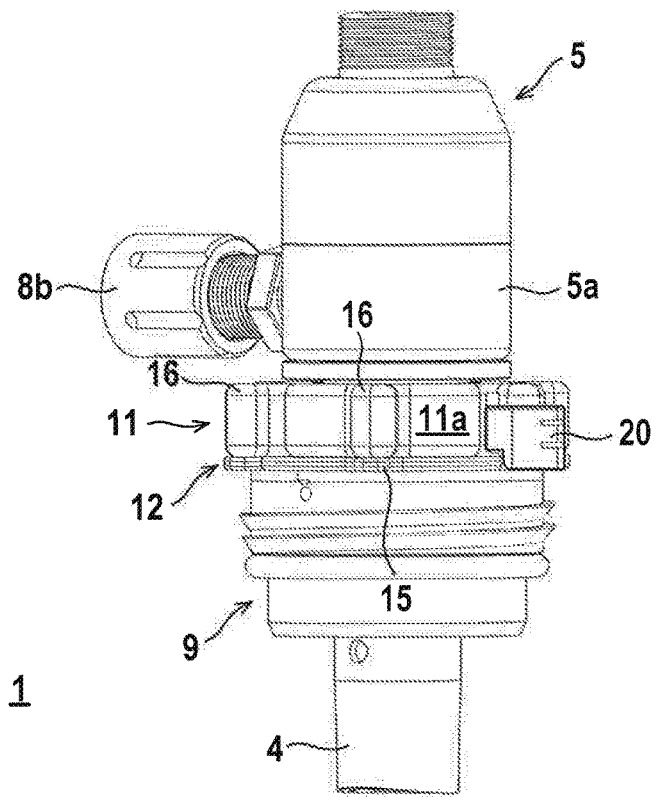
FIG. 5: Detailed view of the withdrawal system according to FIGS. 2 and 3 with a sliding element in a locking position.

In the case illustrated in FIG. 5, the projection elements 16 of the collar 11 are located exactly above the projections 15 of the locking element 12 after the threaded connection is produced via the collar 11. In this case, the cavity of the sliding element 20 is slipped over the projection 15 located below the cavity when the sliding element 20 is moved into the locking position, so that the lower edge of the sliding element 20 surrounds the projection 15. As a result, the sliding element 20 is latched at this projection 15, whereby the threaded connection between collar 11 and immersion pipe 4 is locked, which means that the withdrawal head 5 can no longer come loose from the immersion pipe 4 in an uncontrolled manner. A release of the threaded connection is only possible again after the sliding element 20 is pushed upward into its release position.

In the case illustrated in FIG. 2, the projection elements 16 of the collar 11 are located offset with respect to the projections 15 of the locking element 12 after the threaded connection is produced. If the sliding element 20 is pushed into the locking position, (as illustrated in FIG. 2), the sliding element 20 is located between two projections 15. In this way, the collar 11 can only be turned as far as the sliding element 20 can move between the projections 15. However, this small degree of freedom of movement is insufficient to loosen the threaded connection, which means that, also in this case, the threaded connection with which the withdrawal head 5 is attached is secured by the mechanical locking unit against uncontrolled opening.

LIST OF REFERENCE NUMERALS (1) Withdrawal system
(2) Container
(2a) Cover
(3) Bung body
(4) Immersion pipe
(5) Withdrawal head
(5a) Base body
(6) Pipe system
(7) Pump
(8a, 8b) Connector
(9) Head piece
(9a) Seating surface
(10a, 10b) Threads
(11) Collar
(11a) Annular body
(12) Locking element
(13) Pin
(14) Recess
(15) Projection
(16) Projection element
(17) Connecting piece
(18) Male threads
(19) Female threads
(20) Sliding element

The invention claimed is:

1. A withdrawal system (1) for a container (2) comprising an immersion pipe (4) mounted on and projecting into the container (2) and having a withdrawal head (5) that is attachable by means of a rotary connection to the immersion pipe (4), characterized in that the withdrawal head (5) attached to the immersion pipe (4) is secured by means of a mechanical locking unit, characterized in that the mechanical locking unit has an actuation element that is movable into a locking position and into a release position, wherein in the locking position the actuation element locks the rotary connection between withdrawal head (5) and immersion pipe (4), and in the release position the actuation element releases the rotary connection between withdrawal head (5) and immersion pipe (4)

wherein the mechanical locking unit has a locking element (12) firmly connected to the immersion pipe (4), said locking element having a discrete array of projections (15) running in the circumferential direction around the immersion pipe (4), the actuation element being secured at a projection (15) or between two projections (15) when in the locking position.

2. The withdrawal system according to claim 1, characterized in that the actuation element is a sliding element (20).

3. The withdrawal system according to claim 2, characterized in that the sliding element (20) is displaceable along an axis running parallel to the longitudinal axis of the immersion pipe (4).

4. The withdrawal system according to claim 1, characterized in that a sliding element (20) that forms the actuation element is latched at a projection (15) or is located in an intermediate space between two projections (15) when in the locking position.

5. The withdrawal system according to claim 4, characterized in that the sliding element (20) has a wall element surrounding a cavity, said cavity terminating at an end face of the sliding element (20), and in that a projection (15) projects into the cavity of the sliding element (20) when the sliding element (20) is in a locking position.

6. The withdrawal system according to claim 1, characterized in that the locking element (12) has an annular segment that surrounds the immersion pipe (4) in the circumferential direction, and in that the projections (15) terminate in the radial direction at the outer edge of the annular segment.

7. The withdrawal system according to claim 6, characterized in that the projections (15) are identically shaped and are arranged at equidistant intervals in the circumferential direction of the annular segment.

8. The withdrawal system according to claim 6, characterized in that pins (13) are provided on the locking element (12) by means of which the locking element (12) is affixed to the immersion pipe (4).

9. The withdrawal system according to claim 1, characterized in that the actuation element is mounted on a collar (11) circumferentially surrounding the withdrawal head (5).

10. The withdrawal system according to claim 9, characterized in that the collar (11) is screwed onto a receptacle of the immersion pipe (4) in order to affix the withdrawal head (5) to the immersion pipe (4).

11. The withdrawal system according to claim 1, characterized in that the withdrawal head (5) is affixed to the immersion pipe (4) by a threaded connection.

12. The withdrawal system according to claim 1, characterized in that liquid can be withdrawn from the container (2) and fed into it via the withdrawal head (5) attached to the immersion pipe (4).

* * * * *